Patented July 5, 1927.

1,634,315

UNITED STATES PATENT OFFICE.

GARRETT N. BANKER, OF KEW GARDENS, NEW YORK.

REMEDY FOR SEASICKNESS.

No Drawing.  Application filed July 1, 1926. Serial No. 119,897.

This invention relates to a novel chemical composition adapted to provide a remedy for sea-sickness which may be taken internally as a remedial agent to alleviate the effects of such illness and reduce the physical disturbances thereof to normal.

By reason of the opportunities for observation and treatment of the malady commonly called "sea-sickness" which my professional work as a ship physician and surgeon has afforded, I have long and carefully studied the complex conditions concerned in the production of that illness, with a view to discovering a medicinal agency which would afford a remedy. The complexity of the factors which produce the illness is considerable; among these factors are the motion of a vessel at sea which disturbs the sense of relation of the body to surrounding objects, whereby the central and sympathetic nervous systems are subjected to shocks, which are soon manifested by abnormal physical reactions, such as giddiness, nausea, etc., followed by a general physical and mental depression, which becomes more and more acute as the stage of vomiting is reached; other factors which contribute to the illness are both mental and physical, for example, the mental state of expectancy or anticipation of an attack which is frequently possessed by the patient even before the voyage is begun, materially aids in preparing the way for the attack; the sense of the body being sustained but by a yielding medium; the odors characteristic of ships; the smell of cooked and cooking food; the displacement of the abdominal viscera, especially the stomach, due to rolling and pitching of the ship; all of these factors contribute to the production of physical reaction commonly called "sea-sickness". The very complexity of the conditions which give rise to sea-sickness has therefore made it very difficult to supply a chemical composition or medicine to which the various nervous and physical disturbances arising from such illness will all generally respond so as to produce a real remedial effect or cure. I have discovered, however, a combination of chemical constituents which is highly effective both as a remedy and as a preventative, and which has been successfully used in over one hundred cases without a single failure; the co-operative effects of the constituents of which upon both the nervous system and bodily organs tend to reduce and control the disturbances thereof until normal reactions are regained.

It is the object of this invention, therefore, to provide a novel combination of chemical ingredients for the purposes above stated, the same being mixed together in predetermined relative proportions, as hereinafter stated, and preferably in the following manner.

My novel chemical composition consists in a combination of scopolomine, ethylmorphine hydrochloride, strychnine sulphate and cerium oxalate. The ingredients are prepared in dry powdered form, are then mixed together and enclosed in gelatine capsules in quantities to provide a dosage of desired strength. The relative proportions, which I find desirable to use per dose, are as follows:—

Scopolomine, one four-hundredth of a grain (1/400th gr.); ethylmorphine hydrochloride, one-eighth of a grain (1/8th gr.); strychnine sulphate, one one hundred and twentieth of a grain (1/120th gr.); and cerium oxalate, two to four grains (2 to 4 grs.).

It will be understood, of course, that some variation in the relative proportions above set forth may be made without departing from the scope of my present invention.

In the functioning of the above novel chemical composition as a remedy for sea-sickness, the scopolomine and the ethylmorphine hydrochloride serve as sedatives, the former acting on the cerebral and spinal nerves so as to depress the higher functions of the brain without undesirable effect upon heart action, while the latter having, especially in combination with the former, a general nerve quieting effect but with particular sedative action upon the ocular nerves; the strychnine sulphate is both a stomachic tonic and heart and nerve stimulant, and is at the same time a physiological antagonist to morphine and similar sedatives, hence in my composition not only functions to produce desired local action on the digestive organs, but serves further as a control or check on any possible over-action of the sedatives, to wit, the scopolomine and ethylmorphine hydrochloride; the cerium oxalate is a gastric sedative, having more or less direct action on the pneumogastric (stomach) nerve, being particularly useful in allaying vomiting, especially where such vomiting is of reflex origin, as is the case in sea-sickness.

The scopolomine is a hypnotic (sleep producer). It first produces a sensation of drowsiness, and after administration the patient becomes quiet, soon falling into a condition in every way similar to natural sleep, lasting for a period, governed by proper dosage, of several hours.

The sedatives in my novel composition tend to quickly reduce the mental and physical reactions of the patient to a state of quiet repose, in which condition both the central and sympathetic nervous systems are shielded, as it were, from the stimuli to undesired reactions which the various factors producing sea-sickness set up, thus producing a physical condition exceedingly favorable to the direct action of the stomachic ingredients of the composition, whereby the cerium oxalate may most favorably react on the stomach especially as a gastric sedative tending to check physical impulses to vomit, while the strychnine sulphate, in addition to its stimulative effect upon the depressed condition of the central and sympathetic nervous system, acts directly with tonic effect upon the stomach; thus all the ingredients work together to effect alleviation of the abnormal or upset physical conditions surrounding seasickness, to the end that a return to normal conditions is induced.

It will thus be obvious that my novel composition contains two groups of ingredients, viz, general sedatives (scopolomine and ethylmorphine hydrochlorate) to shield the patient from reflex origins of disturbance, and stomachic agents for direct action on the stomach to both quiet abnormal tendencies or qualms (cerium oxalate) and at the same time stimulate the stomach to normal tone (strychnine sulphate). The scopolomine, as aforesaid, produces a condition closely resembling natural sleep, from which the patient awakes as from natural sleep to normal physical reactions without depression or other undesirable effects.

In using my novel composition as a remedy for seasickness, one dose or treatment is generally sufficient to restore the patient to normal; sometimes, however, a stubborn case will require a second dose or treatment administered at a desired interval following the first treatment, but it is rarely that a third treatment is ever required.

Having thus described my invention, I claim:—

1. A composition of matter for use in overcoming and preventing seasickness by shielding the nervous system from reflex stimuli and relieving the stomach of nervous and direct muscular reactions, comprising scopolomine and ethylmorphine hydrochlorate as the shielding sedatives, cerium oxalate as a direct stomach-settling agent, and strychnine as a stomachic tonic.

2. A composition of matter as defined in claim 1, wherein the named ingredients are intermixed in the following relative proportions by weight; to wit, scopolomine, one four-hundredth of a grain; ethylmorphine hydrochlorate, one-eighth grain; cerium oxalate, two to four grains; and strychnine sulphate, one one hundred and twentieth of a grain.

In testimony, that I claim the invention set forth above I have hereunto set my hand this 29th day of June, 1926.

GARRETT N. BANKER.